Jan. 4, 1938.　　　F. ZAGELMEYER　　　2,104,576
TRAILER COUPLING
Original Filed Nov. 11, 1933
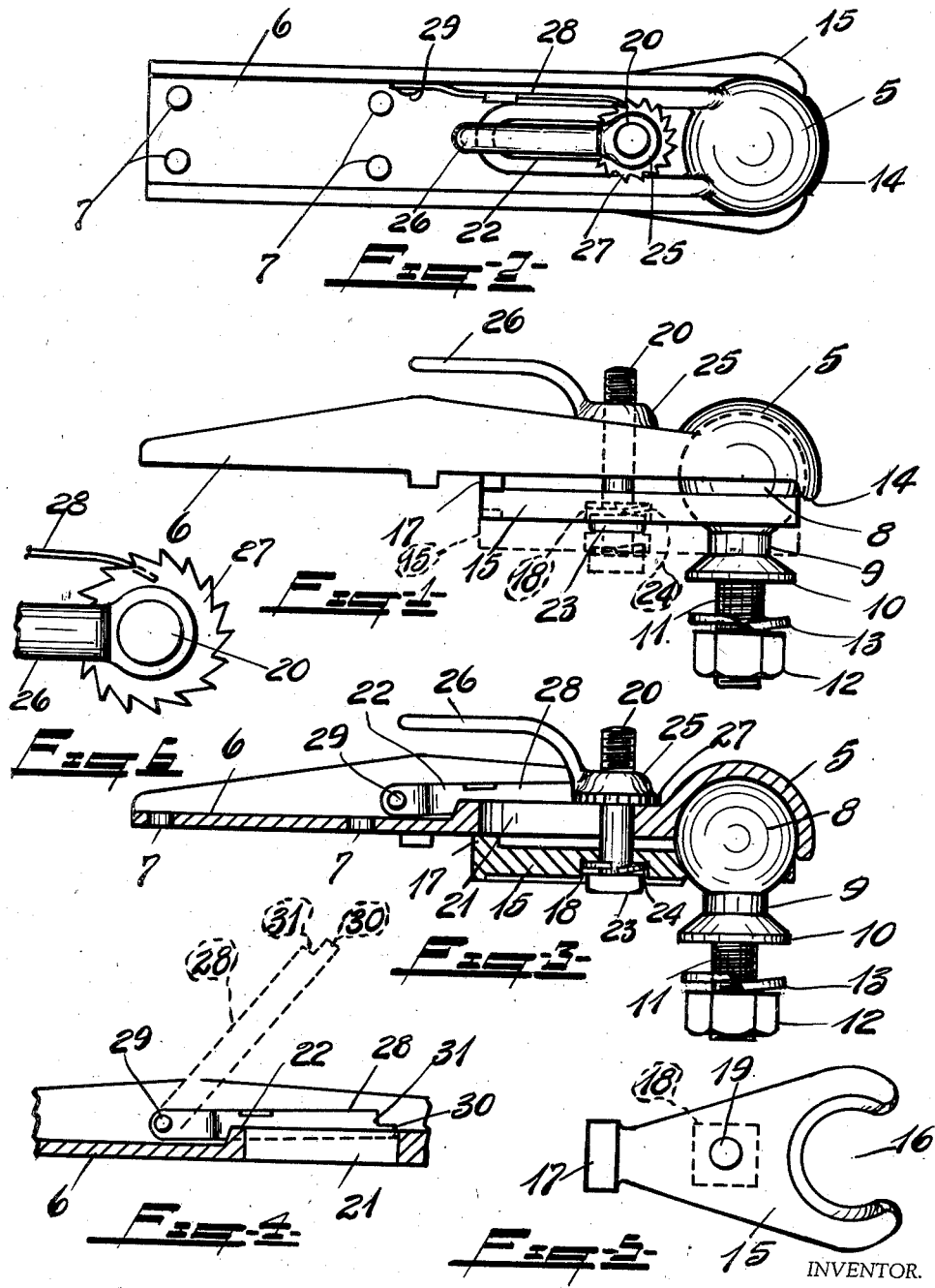
INVENTOR.
Frank Zagelmeyer
BY Frank C. Larman.
ATTORNEY.

Patented Jan. 4, 1938

2,104,576

UNITED STATES PATENT OFFICE 2,104,576

TRAILER COUPLING

Frank Zagelmeyer, Bay City, Mich., assignor to Zagelmeyer Auto Camp Company, Bay City, Mich., a corporation of Michigan Continuation of application Serial No. 697,547, November 11, 1933. This application January 12, 1935, Serial No. 1,523

11 Claims. (Cl. 280—33.15)

The present invention relates to trailer couplings such as used for connecting a trailer or other apparatus to an automobile or other power vehicle, and is a continuation of my abandoned application, Serial No. 697,547, filed November 11, 1933.

One of the prime objects of the invention is to provide a simple, practical, safe, and inexpensive coupling which can be easily and quickly released or attached when under strain or in any position of the power vehicle or trailer, which does not require "slack" between the power vehicle and trailer to permit it to be operated, and in which the pressure is down so that the ball automatically nests in proper position, leaving the operator's hands free for any desired purpose.

Another object is to design a trailer coupling having a divided socket and provide adjustable yieldable means for providing an adjustable yieldable pressure against the ball bolt, thereby eliminating chatter and providing a smooth working fit.

A further object is to design a coupling which automatically takes up wear, which securely retains the various parts in their proper position and relation, which is automatically locked to prevent accidental disengagement, and which cannot be opened by severe jolts, jars, jams, or rough roads.

A still further object is to provide a ball joint coupling which provides for maximum engagement or contact of the ball in the socket, and which eliminates back lash, lost motion, and noise.

To the above ends and others which may hereinafter appear, my invention consists of such parts, and combinations of parts which fall within the scope of the invention as claimed.

In the drawing:—

Fig. 1 is a side elevation of a coupling embodying my invention, the broken lines showing the yoke in position to permit removal of the ball bolt.

Fig. 2 is a top plan view.

Fig. 3 is a longitudinal sectional view through the coupling.

Fig. 4 is a detail of the ratchet lock, the broken lines showing the spring swung up and out of engagement with the ratchet.

Fig. 5 is a detail plan view of the yoke which forms the lower socket.

Fig. 6 is an enlarged detail of the ratchet, nut, and locking clip.

In the conventional couplings at present on the market, it is usually necessary to pull or otherwise bring the trailer closer to the vehicle to provide "slack" before the coupling can be detached, and if the vehicle is on slightly rolling or uneven ground, the operator must utilize one hand for unlocking while holding the trailer stationary with the other; furthermore, most of these couplings have a limited wearing surface and do not positively lock, consequently, they are noisy and dangerous, and I have therefore perfected a simple and practical coupling which can be detached without providing the "slack" above referred to, which also provides a maximum bearing surface, which automatically takes up wear, and which is positively locked so that it cannot become accidentally detached.

As above pointed out, I employ the well known ball and socket principle, so that a universal movement is provided, the socket member being designated at 5, and terminates in a channel shaped section 6 to which the forwardly projecting tongue or pole piece (not shown) of the trailer or vehicle to be drawn is connected, suitable spaced apart openings 7 being provided in the section 6 to facilitate the securing of the tongue or pole piece.

The ball bolt or member 8 is formed as clearly shown in Figs. 1 and 3 of the drawing, the head being shaped to fit the socket 5, and terminates in a neck section 9 formed with a shouldered portion 10, and a threaded stem 11 projects therefrom and is adapted to receive a nut 12 as usual, a lock washer 13 being mounted on the stem to rigidly secure the coupling to a hitch.

The front lip section 14 of the socket 5 projects below the rim thereof and below the horizontal center line of the ball, so that said socket covers considerably more than one-half of said ball and provides for maximum bearing surface. A yoke member 15 also forms a part of the socket and engages the lower half of the ball 8, the front end being open and forming a throat 16 of a size to accommodate the neck section 9 of the ball bolt, the circular inner edge being shaped to fit the curvature of the ball, the opposite end terminating in a boss 17 which engages the lower face of the section 16 and spaces the yoke portion of the socket from said section. A socket 18 is formed intermediate the length of the yoke, and a bolt opening 19 is formed therein to accommodate the bolt 20 so that the yoke may be secured in position.

An elongated slotted opening 21 is provided in the channel shaped section, and a raised rim 22 surrounds said opening, the bolt 20 projecting through the openings 19 and 21, with the head 23 mounted in the socket 18, a resilient member 24 being interposed between the head and bottom of the socket so that a yielding pressure is provided against the ball to force it into the socket and eliminate chattering or rattle, and this is an important feature due to the fact that the ball bolt is cast, consequently, there are variations in size and some unevenness in the balls, and this is taken care of by adjusting to provide the suitable pressure, and while in the present instance I have shown the yieldable adjustable member in the form of a spring washer, it will be understood that any other desired suitable resilient member may be employed.

The upper end of the bolt 20 is threaded, and a ratchet nut 25 is provided on the said threaded end, a handle 26 being formed integral with the nut 25, the lower edge of said nut being toothed as shown at 27, and a resilient clip 28 engages said toothed section, said clip being pivotally connected to the channel shaped section 6 by means of the rivet 29, the curved projecting section 30 of the free end engaging the under side of the toothed nut (see Fig. 6), the shouldered portion 31 engaging the teeth 27, and this clip can be forced horizontally out of engagement with the nut, and can then be swung upwardly and out of contact as indicated by the broken lines in Fig. 4 of the drawing, to permit the nut to be readily backed off when desired.

I wish to direct particular attention to the fact that the boss 17 is spaced from the ball 8 so that it automatically takes up any wear and that the end of the yoke embraces the ball and forms the lower part of the ball socket, and it will be obvious that this yoke must be lowered and then shifted rearwardly before the ball can be disengaged.

When the coupling is disengaged, the yoke will be in position as indicated in broken lines in Fig. 1 of the drawing, and when it is desired to attach, the ball is first placed in the socket, the yoke is then shifted forward so that the neck 9 is received by the throat 16, the handle 26 is then rotated to draw the yoke up and into engagement with the bearing surface of the yoke, the spring 28 engaging the toothed section 27 of the nut 25 to hold it securely in position.

From the foregoing description it will be obvious that I have perfected a very simple, practical, and substantial coupling which cannot accidentally disengage, which is easy to attach or detach, which provides for an adjustable yieldable pressure on the ball, and which is economical to manufacture and assemble.

What I claim is:

1. A trailer coupling of the class described and comprising a two-part socket member, a ball member journaled therein, a bolt for securing the parts in assembled relation, a toothed nut on the bolt, and a pivotally mounted resilient clip mounted on the socket member and shaped to simultaneously engage the teeth and bottom face of the nut for preventing the unscrewing thereof or the accidental displacement of the clip.

2. A trailer coupling comprising a socket member, a ball shaped member fitted in said socket, a yoke formed with an open throat shaped to closely fit the lower spherical section of said ball member and shiftable downwardly and horizontally out of engagement therewith, means for securing said yoke in position, and resilient means on said securing member for providing a yieldable pressure against said ball member.

3. A trailer coupling comprising an upper socket member, a ball member fitted in said socket, a yoke slidably mounted on the socket member and formed with an open, ball engaging throat, the edges of the throat being shaped to closely fit the lower spherical section of the ball member, said yoke being shiftable horizontally into or out of engagement with the ball, and means for securing said yoke to the socket member.

4. A trailer coupling comprising a socket member, a ball shaped member fitted in said socket, a yoke slidably mounted on the socket member formed with an open throat shaped to closely fit the lower spherical section of said ball member and shiftable downwardly and horizontally out of engagement therewith, and rigid means for securing said yoke in set position.

5. A trailer coupling of the class described and comprising a socket member, a ball member fitted in said socket, a yoke slidably mounted on said socket member, the edges being shaped to closely fit and embrace the lower spherical section of said ball, means for vertically spacing one end of the yoke from the socket member, and means for securing said yoke in position and providing a yielding pressure against said ball member.

6. A trailer coupling of the class described and comprising a socket member formed with a rearwardly extending section having a slotted opening therein, a ball member journaled in said socket member, a yoke member engageable with said ball and slidable on said socket member, and means mounted in said yoke and projecting through said slotted opening for securing said yoke in position.

7. A trailer coupling of the class described and comprising a socket member, a ball member journaled in said socket member, a yoke, one end of said yoke engaging said ball, the opposite end having a raised boss in engagement with the socket member, and means intermediate the length of the yoke for forcing the outer end of the yoke yieldingly against said ball.

8. A trailer coupling of the class described and comprising a socket member formed with a rearwardly extending channel shaped section, a slotted opening in said section, a ball journaled in said socket, a yoke spaced from said section and engaging the lower section of the ball member, a bolt extending through said yoke and slotted opening, a ratchet nut threaded on said bolt, and resilient means engaging said ratchet nut for securing it in set position.

9. A trailer coupling of the class described and comprising a socket member, a ball member fitted in said socket member, a yoke embracing said ball with its remote end in engagement with the socket member, a bolt for securing said yoke in position to hold the ball in the socket, and a slot in the socket member to accommodate said bolt and permit the yoke to be shifted downwardly and rearwardly to release said ball from said socket.

10. A trailer coupling comprising a socket member formed with a rearwardly extending portion, a ball member mounted in the socket member, a yoke embracing the lower section of the ball and spaced from said socket member, a bolt for securing the yoke in position, a toothed nut on the bolt, and a pivotally mounted resilient clip on said socket member and having ratcheted engagement with said nut for preventing the unscrewing thereof when the clip is in locked position.

11. A trailer coupling comprising a main socket member, a ball member journaled in the socket, a ball yoke spaced from the socket member with its outer end shaped to closely fit and embrace the lower spherical section of the ball member, means for securing said ball yoke in assembled position with the socket member, and means including a pawl and ratchet to prevent the loosening of said securing means.

FRANK ZAGELMEYER.